United States Patent [19]

Oya

[11] Patent Number: 4,888,460
[45] Date of Patent: Dec. 19, 1989

[54] FIXING STRUCTURE FOR COMPONENTS OF A COOKING APPLIANCE

[75] Inventor: Yuichiro Oya, Sennan, Japan

[73] Assignee: Sharp Kabushiki Kaisha, Osaka, Japan

[21] Appl. No.: 323,095

[22] Filed: Mar. 13, 1989

Related U.S. Application Data

[63] Continuation of Ser. No. 108,994, Oct. 16, 1987, abandoned.

[30] Foreign Application Priority Data

Mar. 19, 1987 [JP] Japan ................................. 62-40557

[51] Int. Cl.⁴ .............................................. H05B 6/64
[52] U.S. Cl. ....................... 219/10.55 R; 219/10.55 E; 126/273 R; 29/462
[58] Field of Search .................. 219/10.55 E, 10.55 R, 219/10.55 D, 391; 126/273 R, 273 A, 275 E; 29/428, 456, 462, 526 R, 526 A

[56] References Cited

U.S. PATENT DOCUMENTS

| | | | |
|---|---|---|---|
| 3,882,756 | 5/1975 | Sauer et al. | 85/41 |
| 3,910,004 | 6/1974 | Beblinger | 52/758 D |
| 4,028,521 | 6/1977 | Uyeda et al. | 219/10.55 B X |
| 4,055,723 | 10/1977 | Vanderford | 219/537 X |
| 4,105,229 | 8/1978 | Kaldenberg | 126/197 X |
| 4,516,563 | 5/1985 | De Larm | 126/362 X |

FOREIGN PATENT DOCUMENTS

| | | |
|---|---|---|
| 1241851 | 6/1967 | Fed. Rep. of Germany . |
| 60-191133 | 9/1985 | Japan ................................. 219/10.55 |
| 518178 | 2/1940 | United Kingdom . |
| 551175 | 2/1943 | United Kingdom . |
| 595145 | 11/1947 | United Kingdom . |
| 1136265 | 12/1968 | United Kingdom . |
| 1341459 | 12/1973 | United Kingdom . |

OTHER PUBLICATIONS

Patents Abstracts of Japan, Section M, M-336 Nov. 6, 1984 vol. 8/No. 240.
Patents Abstracts of Japan, Section M, vol. 6(1982), No. 83, (M-130).

*Primary Examiner*—Philip H. Leung
*Attorney, Agent, or Firm*—Birch, Stewart, Kolasch & Birch

[57] ABSTRACT

In a support structure of an internal compartment of a cooking appliance where the rear side of an internal compartment is fixed to a back plate of an external housing using screws, flanges are provided on a rear plate of the internal compartment and other internal compartment members adjacent to the rear plate are overlaid with each other, and the screws are theadably engaged with the contraction holes formed on both overlaid flanges.

4 Claims, 2 Drawing Sheets

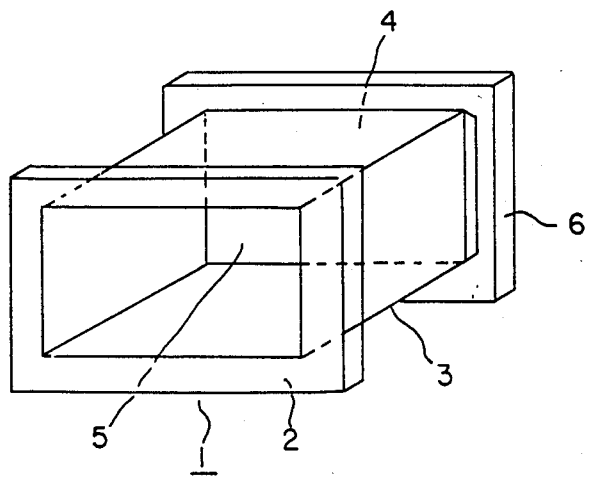
FIG. 3
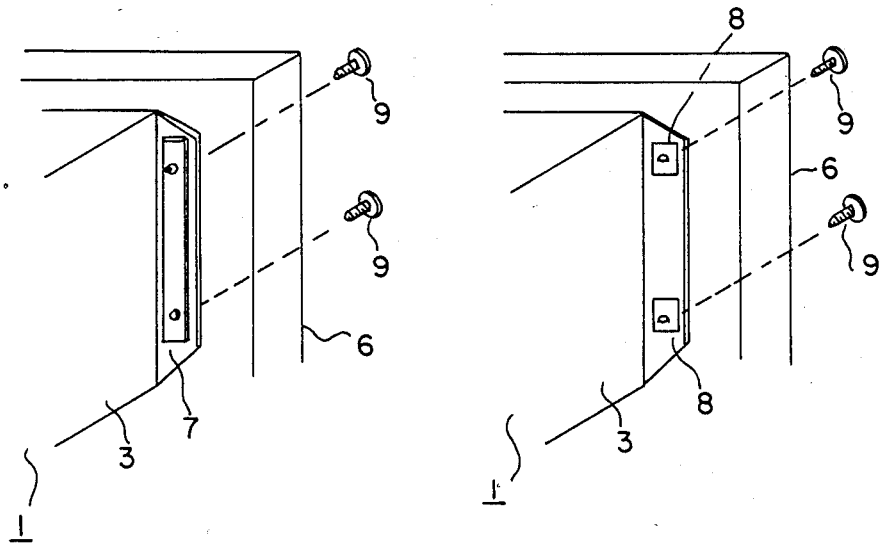
FIG. 4(a)
(PRIOR ART)
FIG. 4(b)
(PRIOR ART)

FIXING STRUCTURE FOR COMPONENTS OF A COOKING APPLIANCE

This application is a continuation of application Ser. No. 108,994 filed on Oct. 16, 1987, now abandoned.

BACKGROUND OF THE INVENTION

1. Field of the Invention

The present invention relates to a cooking appliance such as a microwave oven, and more particularly to a support structure at a rear side of an internal compartment, i.e., a heating chamber of a cooking appliance.

2. Prior Art Discussion

In general, in a microwave oven, as shown in FIG. 3, an internal compartment 1 is composed to a front plate 2, a main base plate 3 in a U like form, a ceiling plate 4 and a rear plate 5. The internal compartment 1 is held to an external housing by fixing the rear side of the internal compartment 1 to a back plate 6 of the external housing using screws.

Each member of the internal compartment 1 is apt to be made of thin metal sheet of thickness 0.4–0.5 mm because of the cost reduction in recent years. If such a thin sheet is provided with a hole and a screw is threadably fixed therethrough, problems in strength will occur, and there is a fear of slippage of the screw resulting in a failure to hold the internal compartment.

Consequently, in the related art, as shown in FIGS. 4(a) and 4(b), the fixing is performed by screws 9 using a reinforcing plate 7 or a tap plate 8.

However, in the conventional structure as above described, since a separate part such as reinforcing plate or a tap plate is required, the number of parts or the cost of parts is increased and also the work efficiency decreases.

SUMMARY OF THE INVENTION

Accordingly, an object of the invention is to eliminate the above-mentioned disadvantages and to provide a structure which can fix and hold an internal compartment such as a heating chamber of a cooking appliance to a back plate of an external housing of the cooking appliance without using a separate part such as a reinforcing plate or a tap plate.

Another object of the invention is to provide a support structure for a heating chamber of a cooking appliance, which can be used in practice without using a separate part.

Other objects and further scope of applicability of the present invention will become apparent from the detailed description given hereinafter. It should be understood however, that the detailed description and specific examples, while indicating preferred embodiments of the invention, are given by way of illustration only, since various changes and modifications within the spirit and scope of the invention will become apparent to those skilled in the art from the detailed description.

In order to solve above-mentioned problems, in a support structure for an internal compartment of a cooking appliance according to the invention, a rear plate of an internal compartment such as a heating chamber and a flange of other internal compartment members adjacent to the rear plate are overlaid with each other and a double contraction hole is formed on both overlaid flanges, and a screw is threadably fixed to the contraction hole thereby fixing the rear side of the internal compartment to the back plate of the external housing.

In the above-mentioned device, the hole with the screw threadably fixed thereto has increased strength, and there is no fear of the screw slipping away carelessly, such that the support structure can be easily used. Furthermore, since a separate part is not required, the number of parts and the cost of parts can be reduced and the work efficiency can be improved.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 3 is a perspective view illustrating the relation of an internal compartment to an external housing in an electronic oven; and FIGS. 4(a) and 4(b) are perspective diagrams illustrating the conventional internal compartment support structure.

DETAILED DESCRIPTION OF THE EMBODIMENT

Figure 1:
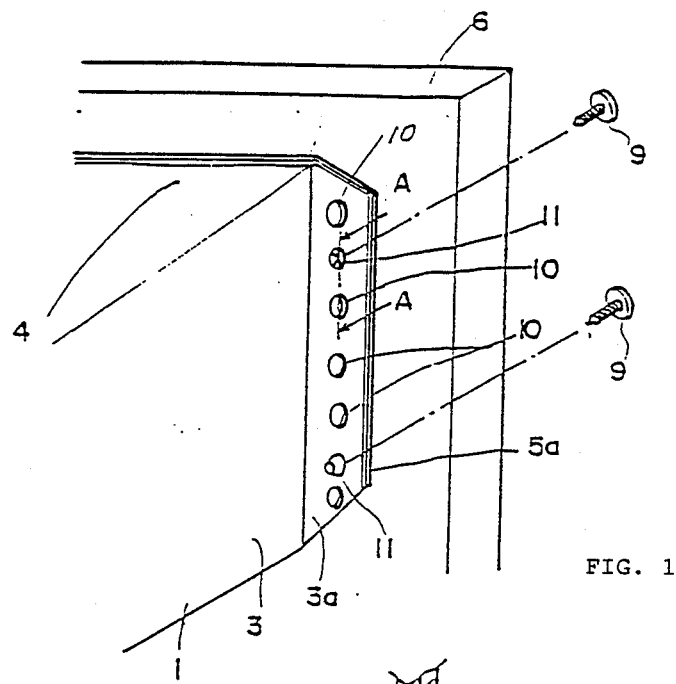
FIG. 1 is a perspective diagram illustrating an internal compartment support structure embodying the invention.
Figure 2:
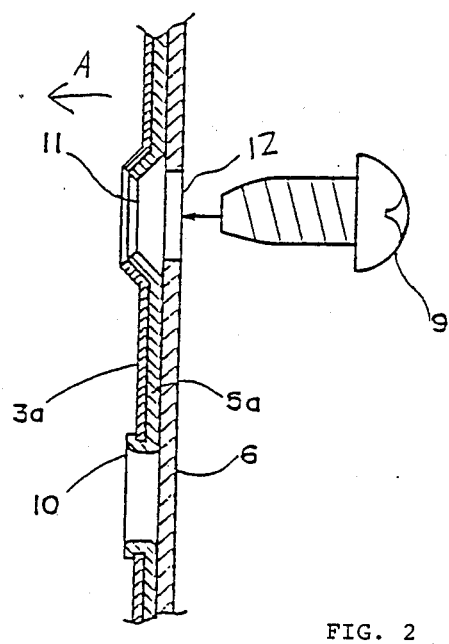
FIG. 2 is a sectional view taken along line A—A of FIG. 1.

An embodiment of the invention will now be described in detail referring to FIGS. 1 and 2. In FIGS. 1 and 2, the same parts as those in FIGS. 3, 4(a) and 4(b) are designated by the same reference numerals.

The outline of a microwave oven as an embodiment of the invention is shown in FIG. 3. An internal compartment 1 functioning as a heating chamber of the microwave oven comprises a front plate 2 having an opening on a front side thereof, a main base plate 3 formed in U-like shape by one sheet and having two side plates and one bottom plate, a ceiling plate 4 mounted on the main base plate 3, and a rear plate 5 mounted on the opposite side to the side where the front plate 2 is mounted on the main base plate 3 and the ceiling plate 4. An external housing to fix the internal compartment 1 as the heating chamber haas an opening on the front side and comprises two side plates, a ceiling plate, a bottom plate (all not shown), and a back plate 6 connected to the side plates, the ceiling plate and the bottom plate, so as to constitute the external housing having the opening. Flanges 3a are provided on end portions of the two side plates of the main base plate 3, and flanges 5a are also provided on end portions of the rear plate 5 corresponding to the flanges 3a. The internal compartment 1 is fixed to the external housing so that the former is contained in the latter.

In the internal compartment 1, the flange 3a of the main base plate 3 and the flange 5a of the rear plate 5 are overlaid with each other, and burring caulking 10 is performed at both flanges 3a, 5a, thereby connecting the main base plate 3 and the rear plate 5. Contraction hole machining is applied to both flanges 3a, 5a thereby forming a double contraction hole 11. Since the burring caulking 10 and the double contraction hole 11 are formed in the same machining direction, both can be formed by a simultaneous machining.

In the embodiment shown, the flange 3a of the main base plate 3 and the flange 5a of the rear plate 5 are provided with a plurality of holes arranged at predetermined intervals, and some of the holes are used to fix the flange 3a of the main base plate 3 and the flange 5a of the rear plate 5 securely so that leakage of microwave or heat from the internal compartment 1 such as the heating chamber is prevented. Some of the remaining holes are used to securely hold the internal compartment to the back plate 6 of the external housing. In an example shown in FIG. 2, two holes are subjected to the double contraction machining so as to hold the internal compartment 1 to the back plate 6 of the external housing, and five holes are subjected to burring caulking so as to fix the flange 3a of the main base plate 3 and the flange 5a of the rear plate 5.

In FIG. 2, when the screw 9 is attached so as to couple the external housing and the internal compartment 1, the screw 9 first passes through a hole 12 provided on the back plate 6 of the external housing. And then the screw 9 is threadably fixed by the double contraction hole 11 serving as the tapped hole engaged with the screw thread together the screw 9 thereby fixing of the external housing and the internal compartment. Holes provided on end portions of the flange 3a of the main base plate 3 and the flanges 5a of the rear plate 5 to constitute the tapped hole to attach the screw 9 are machined to project in the direction of arrow A, i.e., in the tightening direction. Since the machining is performed in such a manner, a space is produced between the hole 12 on the back plate 6 and the tapped hole 11 provided on the overlaid body of the flanges 3a and 5a and bent in the tightening direction. According to the space, the plate thickness becomes about two times that of an ordinary slate thickness. The double contraction hole is provided on the overlaid body of the flanges 3a and 5a. In other words, the end portion of the tapped hole 11 is formed to engage with the screw thread of the screw 9.

In the invention, the screw 9 is threadably engaged with the double contraction hole 11 whereby the internal compartment 1 is fixed and held to the back plate 6 of the external housing. The double contraction hole 11 is strong in comparison to an ordinary hole, and the plate thickness is about double in comparison to conventional one, such that the engagement failure at the threaded portion is not easily produced. Consequently, the screw 9 does not slip and the rear side of the internal compartment 1 can be securely held to the back plate 6 of the external housing.

Although the flanges 3a are provided on both side plates of the main base plate 3 and the flanges 5a are provided on both side ends of the rear plate 5 corresponding to the flanges 3a in the above embodiment, in addition to these, flanges may be provided on the bottom plate of the main base plate 3 and the ceiling plate 4 and flanges may be provided on upper and lower ends of the rear plate 5 in a position corresponding to the flanges of the bottom plate and the ceiling plate 4 as shown in FIGS. 1 and 2.

Although the coupling means between the flange 3a on both side plates of the main base plate 3 and the flange 5a of the rear plate 5, and the coupling means between the internal compartment 1 and the back plate 6 of the external housing are provided with five holes and two holes respectively in the above embodiment, the number may be varied or the arrangement may be varied according to the size and the weight of the internal compartment 1.

Although both flanges 3a, 5a are coupled by caulking in the above embodiment, the coupling is not limited to this and spot welding or the like may be used.

According to the invention as above described, the rear side of the internal compartment can be held to the back plate of the external housing without using a separate part such as a reinforcing plate or a tap plate. Furthermore, the holding device can be easily used, and the number of parts and the cost of parts can be reduced and the work efficiency can be improved.

The internal compartment and the external housing used in the embodiment are made of a metal sheet.

The flanges 3a, 5a are coupled by means of burring caulking in the above embodiment. The burring caulking as shown in FIG. 2 is a method of caulking in which the ends at the periphery of the hole of the flanges 5a surround the peripheral end portion of the hole of the flange 3a.

While only certain embodiments of the present invention have been described, it will be apparent to those skilled in the art that various changes and modifications may be made therein without departing from the spirit and scope of the present invention as claimed.

What is claimed is:

1. A fixing configuration which joins an internal cooking compartment to an external housing of a cooking appliance which comprises:
   an internal cooking compartment consisting of a front plate, ceiling plate, rear plate having first outwardly bent flanged edges on end portions of said rear plate, and a main base plate having a U-shaped configuration including a bottom plate and two opposing side plates, said side plates of said main base plate having second outwardly bent flanged edges on end portions thereof corresponding to and abutting with said first flanged edges, said first and second flanged edges being joined by burring caulking fixing said rear plate to said main base plate;
   an external housing including a back plate juxtapositioned to said rear plate of said internal cooking compartment having a plurality of spaced holes formed therein;
   said joined first and second flanged edges of said internal cooking compartment having a plurality of spaced double contraction holes formed therethrough in a predetermined direction, such that said plurality of spaced double contraction holes are aligned with said plurality of spaced holes of said back plate of said external housing, there being a predetermined space between said aligned double contraction holes and said back plates holes; and
   a plurality of threaded screw members to be inserted into said aligned double contraction holes and said back plates holes for fixing said first and second joined flanged edges of said internal cooking compartment to said back plate of said external housing.

2. The fixing configuration of claim 1, wherein said predetermined space is twice the thickness of said joined abutting flanged edges.

3. The fixing configuration of claim 1, wherein said plurality of spaced holes of said back plate of said external housing and said plurality of spaced double contraction holes are threaded.

4. A method of joining an internal cooking compartment to an external housing of a cooking apparatus which comprises:

providing an internal cooking compartment consisting of a front plate, ceiling plate, rear plate having first outwardly bent flanged edges on end portions thereof and a main base plate having a U-shaped configuration including a bottom plate and two opposing side plates, said side plates of said main base plate having second outwardly bent flanged edges on end portions thereof corresponding to and abutting with said first flanged edges, substantially simultaneously burring caulking said abutting flanged edges together and contraction hole machining said abutting flanged edges, thereby forming a plurality of double contraction holes in said abutting flanged edges such that since both burring caulking and double contraction hole machining are performed in the same direction both are performed by simultaneous machining, providing an external housing including a back plate having a plurality of spaced holes formed therein which back plate is placed into contact with said rear plate of said internal cooking compartment such that said plurality of spaced holes are aligned with said plurality of spaced double contraction holes of said internal cooking compartment, and inserting a plurality of threaded screw members into said aligned double contraction holes and said back plate holes thereby joining said internal cooking compartment to said external housing.

* * * * *